United States Patent [19]

Amburn

[11] 3,765,125

[45] Oct. 16, 1973

[54] APPARATUS FOR TREATING SEEDS

[76] Inventor: Raymond D. Amburn, 8325 Riverland Dr. (6 No. 1), Sterling Heights, Mich. 48078

[22] Filed: July 3, 1972

[21] Appl. No.: 268,285

[52] U.S. Cl. .................................................. 47/1.3
[51] Int. Cl. ............................................. A01g 7/04
[58] Field of Search .................................. 47/1.3, 58

[56] References Cited
UNITED STATES PATENTS
3,675,367   7/1972   Amburn ............................... 47/1.3

*Primary Examiner*—Robert E. Bagwill
*Attorney*—Reising, Ethington, Perry & Thorpe

[57] ABSTRACT

Apparatus for treating seeds to induce magnetism in the seeds including a hopper for containing a quantity of seeds to be treated, a conveyor for conveying seeds from the hopper, a tubular conduit having its inlet end disposed to receive seeds from the discharge end of the conveyor and its outlet end diposed below the inlet end. Radiant energy means is supported above the conveyor for exposing seeds being conveyed by the conveyor to radiant energy prior to discharge of the seeds into the inlet of the tubular conduit, and a magnet is supported on the tubular conduit for producing a magnetic field within the conduit. Agitating means is provided in the conduit for varying the orientation of seeds passing through the conduit with respect to the magnetic field.

23 Claims, 2 Drawing Figures

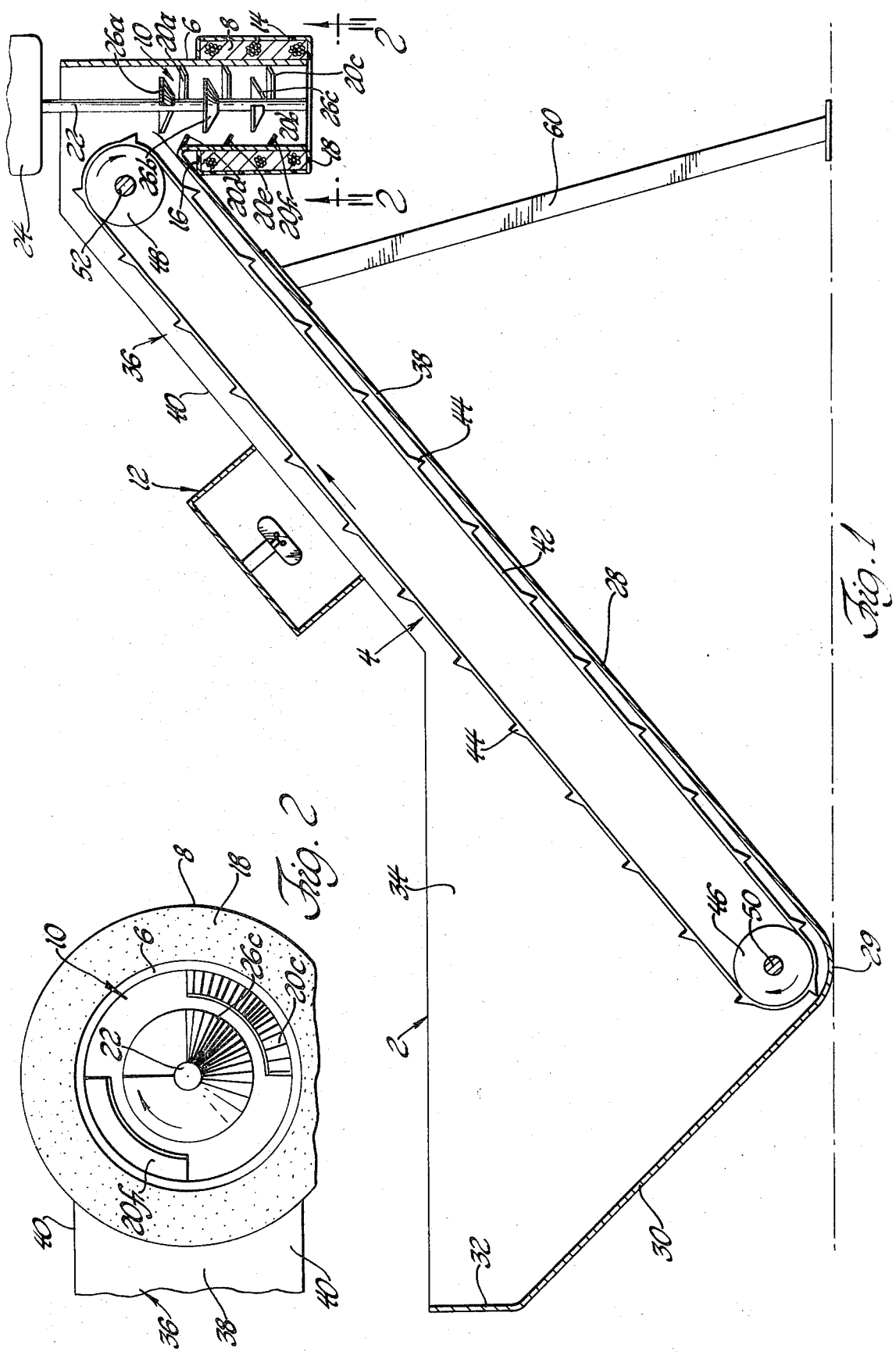

APPARATUS FOR TREATING SEEDS

This invention relates generally to the treatment of seeds for increasing the rate of germination of the seeds and the rate of plant growth from the seeds, and is particularly concerned with the treatment of seeds by inducing magnetism into the seeds.

As discussed in the prior U.S. application of the inventor, Ser. No. 58,484, filed July 27, 1970, now U.S. Pat. No. 3,675,367 and entitled "Apparatus For Magnetically Treating Seeds," the entire disclosure of which is incorporated herein by reference, it has long been known that the rate of germination of seeds and the rate of plant growth from the seeds is affected by magnetism. This phenomenon is discussed in the Summer, 1968 issue of *Canada Agriculture* in an article entitled "Biomagnetism—A Mysterious plant Growth Factor" By U. J. Pittman.

Insofar as the effects of magnetism on the germination rate of seeds is concerned, the exact type of action that takes place is not completely known. However, when a seed is placed between the north and south poles of a regular horseshoe magnet for a period of time, it is known that the seed will germinate faster and that the resulting plant will be larger than plants from seeds not so treated. As is pointed out in the Pittman article referred to in the preceding paragraph, seeds that have been placed in a stationary position between the poles of a permanent magnet for periods of up to 240 hours prior to planting germinate faster and grow more during the seedling stage.

As pointed out in the prior u.S. application Ser. No. 58,484 referred to above, it is believed that the time required to adequately magnetically treat a seed depends to a large extent on the position of the seed with respect to the magnetic field, and that there is an ideal position for each seed with respect to the magnetic field in which the seed will become almost instantaneously energized by the magnetic field. It is believed that magnetism is induced into the seeds through the RNA (Ribonucleic Acid) molecules, and that the RNA molecules orient themselves with the magnetic field when the seed is placed in the magnetic field. If the seed were placed in the ideal position within the magnetic field, the effects of the magnetism would be induced in the seed almost instantaneously. As pointed out above, if a seed is placed in a stationary position, it will become magnetized after an exposure time of 240 hours which appears to indicate that under the worst circumstances, that is, with the seed in the worst possible orientation with respect to the magnetic field, the seed will be magnetized after a period of 240 hours.

Experimentation to date has also indicated that the rate of germination and growth of the plants from magnetically treated seeds is also influenced by the termperature of the seeds at the time of treatment, as well as the moisture content of the seeds at the time of treatment. Experiments have indicated that by controlling the moisture content and temperature of the seeds when they are exposed to the magnetic energy, more predictable and favorable results can be achieved from the magnetically treated seeds. Exposing the seeds to various types of radiant energy, including infrared, radio frequency, electromagnetic and microwave radiation prior to magnetic treatment would appear, from experiments and studies to date, to improve the results achieved by the magnetic treatment.

An object of this invention is to provide apparatus for magnetically treating seeds to increase their germination and growth rate by moving the seeds through a magnetic field and causing the seeds to assume a multiplicity of positions while in the magnetic field to substantially reduce the exposure time necessary to adequately treat the seeds wherein means is provided for increasing the turbulence of the seeds as they may move through the magnetic field to increase the likelihood that each seed will be fully magnetized.

Another object is to provide apparatus for magnetically treating seeds to increase their germination and growth rate including means for exposing the seeds to radiant energy, such as infrared radition, prior to their entry into the magnetic field.

In carrying out the foregoing, and other objects, apparatus according to the present invention includes a magnet with a conduit for seeds having an inlet and outlet, the conduit being secured to the magnet and extending through the field thereof for conducting seeds through the magnetic field. Agitating means is provided in the conduit for causing turbulent flow of the seeds through the magnetic field to vary the orientation of the seeds with respect to the magnetic field. The agitating means includes a plurality of stationary baffles spaced along the length of the conduit for deflecting seeds away from the wall of the conduit, and rotating means for centrifugally deflecting seeds toward the wall of the conduit.

The apparatus may further include a hopper for containing a quantity of seeds to be treated with a conveyor for conveying the seeds from the hopper to the inlet of the tubular conduit. The tubular conduit is supported with its inlet disposed to receive seeds from the discharge end of the conveyor and its outlet located below the inlet so that seeds move through the conduit by gravity after being discharged from the conveyor. Radiant energy means such as an infrared heater is supported above the conveyor for exposing the seeds being conveyed to the infrared energy to increase the temperature prior to discharge of the seeds by the conveyor into the inlet of the tubular conduit for exposure to the magnetic field.

Preferably, the conveyor is a belt conveyor having transverse flights so that a relatively wide, thin layer of seeds can be moved by the conveyor beneath the infrared heater so that the seeds can obtain maximum exposure to the infrared radiation, although other types of conveyors, such as augers, may also be employed. However, in the latter case, more intensive radiation may be required or larger infrared heaters may be required.

Preferably, the hopper is formed with a housing that extends from one end thereof for supporting part of the conveyor. The hopper and housing may be of molded plastic material. The conveyor has its input end received in the hopper and its discharge end disposed adjacent the inlet of the tubular conduit having the magnet mounted thereon. The tubular conduit may be formed as an integral part of the conveyor housing. The conveyor housing is preferably supported by a support means in an inclined position with respect to the ground with the tubular seed conduit disposed vertically.

Other objects, advantages and features of the invention will become apparent from the following description taken in connection with the accompanying drawings in which:

FIG. 1 is a sectional elevational view of apparatus according to the invention; and FIG. 2 is a view taken on lines 2—2 of FIG. 1.

The apparatus illustrated in the drawings includes a hopper 2, a conveyor 4, a tubular seed conduit 6 having a magnet 8 mounted thereon for providing a magnetic field within the tubular conduit 6, agitating means in the conduit 6 designated collectively by reference numeral 10, and radiant energy means 12 disposed to expose seeds on the conveyor 4 to radiant energy prior to discharge of the seeds by the conveyor into the tubular conduit 6. The radiant energy means 12, in the illustrated embodiment, may be an infrared heater of conventional construction.

The magnet 8 comprises an electromagnet which is mounted on the tube 6 such that the tube 6 extends coaxially through the magnet and through the magnetic field produced thereby. The windings of the magnet are wrapped around the tube 6 so that when the magnet is energized, a magnetic field is provided within tube 6 in the path of seeds moving through the tube. The tube 6, of course, has a fixed directional relationship with the magnetic field since the windings of the magnet in FIG. 1 are fixed with respect to the tube 6. In the illustrated embodiment, the tube 6 is formed of polyvinyl chloride.

The windings of the electromagnet 8 are enclosed by a cover including a cylindrical sheath or casing 14 and annular end walls 16 and 18, elements 14, 16 and 18 being of plastic or other nonmagnetic material, or material that will not act to significantly decrease the intensity of the magnetic field generated by the electromagnet 8 when the magnet is energized. Thus, seeds passing through the tube 6 on the upper, inlet end to the lower, outlet end are passed through the field of the magnet 8.

The agitating means 10 includes a plurality of stationary baffles 20 spaced along the length of the conduit 6 for deflecting seeds away from the wall of the conduit 6. In the illustrated embodiment, six such baffles are shown and are designated by reference numerals 20a through 20f. The baffles 20a–f are inclined away from the wall of the conduit 6 toward the lower, outlet end of the conduit. As illustrated in FIG. 2, each of the baffles circumscribes an arc of 45°, the baffles being located on diametrically opposite sides of the conduit. It is, of course, within the scope of the present invention that the baffles may be staggered angularly about the axis of conduit 6 with respect to each other along the length of the conduit.

The agitating means 10 further includes rotating means for centrifugally hurling seeds toward the wall of the conduit 6 as the seeds pass through the conduit. The rotating means includes a shaft 22 extending from a motor 24 supported above the upper, inlet end of the conduit 6, and a plurality of cone-like disc members 26 mounted on shaft 22 and spaced from each other along the length of the shaft. The illustrated embodiment includes three disc members 26, the disc members being individually designated by reference numerals 26a, b and c. Each of the disc members 26a–c comprises a circular segment in plan extending 270° around the axis of the shaft 22, and adjacent pairs of the disc members are angularly staggered with respect to each other about the axis of shaft 22. Each of the disc members is shaped to define a portion of the surface of a cone with the large end thereof located with respect to the small end thereof toward the upper, inlet end of the conduit 6.

The hopper includes front and rear inclined walls 28 and 30, respectively, connected by a curved bottom wall 29. The rear inclined wall 30 terminates at the lower edge of a rear vertical wall 32 extending between a pair of side walls 34.

Extending upwardly and forwardly from the hopper 2 as viewed in FIG. 1 is an inclined housing 36 for the conveyor 4. The housing 36 includes a bottom wall 38 which, in the illustrated embodiment, defines a continuation of wall 28 of the hopper 2. The bottom wall 38 extends between a pair of spaced side walls 40 which connect at their lower ends with the respective side walls 34 of the hopper 2. As shown in the drawings, the tubular conduit 6 is formed as an integral part of the housing 36 at the upper end thereof.

The conveyor 4 comprises an endless belt 42 having transverse flights 44. The belt 42 is mounted on a roller 46 at the input end of the conveyor and a roller 48 at the discharge end of the conveyor. Roller 46 has a shaft 50 and roller 48 has a shaft 52. One of the shafts 50 or 52 is connected to a motor or other conventional power source for driving the conveyor such that the upper run of the belt 42 moves upwardly and toward the right to discharge seeds from the hopper 2 into the inlet end of the conduit 6.

In operation, the conveyor 42 picks up seeds in the hopper 2 from its input end at roller 46 and carries them along the upper run of the belt 42 to be discharged into the inlet end of the conduit 6. The infrared heater 12 exposes the seeds to infrared radiation as they pass beneath the conventional infrared heater 12. As the seeds are discharged into the inlet end of the tubular conduit 6, the stationary baffles 20 cooperate with the rotating disc members 26 to agitate the seeds and cause turbulent flow of the seeds through the conduit 6 while in the field of the magnet 8. The disc members 26 operate to hurl the seeds radially outwardly and upwardly from the shaft 22 toward the wall of the conduit 6, while the baffles 20 deflect the seeds radially inwardly away from the wall 26 toward the rotating disc members. Consequently, each seed changes its orientation with respect to the magnetic field numerous times as it passes through the conduit 6 with a turbulent, rolling and tumbling motion. The seeds may be received from the lower, outlet end of the tubular conduit 6 into a bag or any conventional container.

The apparatus illustrated in FIG. 1 includes support legs 60 which engage the housing 36 near the upper end thereof so that the apparatus is supported on the lower ends of the legs 60 and the curved bottom wall 29 of the hopper. In this position, the tubular conduit 6 is disposed vertically so that the lower, outlet end of the conduit is located below the upper, inlet end.

While a belt conveyor is the preferred form of the conveyor 4 since a large number of seeds can be exposed directly to the radiation from the radiant energy source 12, it is also within the scope of the invention to use an auger or other type conveyor for moving the seeds from the hopper to the conduit 6.

While a specific embodiment of the invention has been disclosed in the accompanying drawings and described in the foregoing specification, it should be understood that the invention is not limited to the exact construction shown. Alterations in the construction and arrangement of parts, all falling within the scope and spirit of the invention, will be apparent to those skilled in the art.

I claim:

1. Apparatus for treating seeds comprising: a magnet for producing a magnetic field; a conduit having an inlet and outlet, said conduit being secured to the magnet and extending through the field thereof for conducting seeds through the magnetic field and means in said conduit for causing seeds moving through the magnetic field in said conduit to roll and tumble while in the magnetic field to vary the orientation of each seed with respect to the magnetic field to induce magnetism in the seeds, characterized in that said last named means comprises a plurality of stationary baffles spaced along the length of said conduit for deflecting seeds away from the wall of said conduit, and rotating means for centrifugally hurling seeds toward the wall of said conduit.

2. Apparatus as claimed in claim 1 wherein said rotating means comprises a shaft having a plurality of disc members mounted thereon and spaced from each other along the length of said shaft.

3. Apparatus as claimed in claim 2 wherein each of said disc members comprises a circular segment extending 270° around the axis of said shaft, adjacent pairs of said disc members being angularly staggered about the axis of said shaft with respect to each other.

4. Apparatus as claimed in claim 3 wherein each of said disc members is shaped to define a portion of the surface of a cone with the large end thereof located with respect to the small end thereof toward the inlet end of said conduit.

5. Apparatus as claimed in claim 4 wherein said baffles are inclined away from the wall of said conduit toward the outlet of said conduit.

6. Apparatus as claimed in claim 5 further including a hopper, and a conveyor for delivering seeds from said hopper to the inlet of said conduit.

7. Apparatus as claimed in claim 6 further including a housing for said conveyor, said conduit being supported by said housing at the discharge end of said conveyor.

8. Apparatus as claimed in claim 7 further including means mounted on said housing for exposing seeds being conveyed by said conveyor to radiant energy before being discharged by said conveyor into the inlet of said conduit.

9. Apparatus as claimed in claim 8 wherein said last named means comprises an infrared heater.

10. Apparatus for treating seeds comprising: a hopper for containing a quantity of seeds to be treated; a conveyor for conveying seeds from said hopper, said conveyor having an input end disposed in said hopper and a discharge end located outside said hopper; a tubular conduit having an inlet and an outlet; means supporting said tubular conduit with its inlet disposed to receive seeds from the discharge end of said conveyor and its outlet located below said inlet; radiant energy means supported above said conveyor for exposing seeds being conveyed by said conveyor to radiant energy prior to discharge of the seeds by said conveyor into the inlet of said tubular conduit; a magnet mounted on said tubular conduit for producing a magnetic field within said conduit; and means in said conduit for varying the orientation of seeds passing through said conduit with respect to the magnetic field.

11. Apparatus as claimed in claim 10 wherein said last named means comprises a plurality of stationary baffles spaced along the length of said tubular conduit for deflecting seeds away from the wall of said conduit, and rotating means for centrifugally hurling seeds toward the wall of said conduit.

12. Apparatus as claimed in claim 11 wherein said rotating means comprises a shaft having a plurality of disc members mounted thereon and spaced from each other along the length of said shaft.

13. Apparatus as claimed in claim 12 wherein each of said disc members comprises a circular segment extending 270° around the axis of said shaft, adjacent pairs of said disc members being angularly staggered about the axis of said shaft with respect to each other.

14. Apparatus as claimed in claim 13 wherein each of said disc members is shaped to define a portion of the surface of a cone with the large end thereof located with respect to the small end thereof toward the inlet end of said conduit.

15. Apparatus as claimed in claim 14 wherein said baffles are inclined away from the wall of said conduit toward the outlet of said conduit.

16. Apparatus for treating seeds comprising: a hopper for containing a quantity of seeds to be treated; a conveyor for conveying seeds from said hopper, said conveyor having an input end disposed in said hopper and a discharge end located outside said hopper; radiant energy means supported above said conveyor for exposing seeds being conveyed by said conveyor to radiant energy; and means for receiving seeds discharged from said conveyor and magnetically treating said seeds.

17. Apparatus as claimed in claim 16 wherein said last named means comprises a tubular conduit having an inlet and an outlet with said inlet disposed to receive seeds from the discharge end of said conveyor, and a magnet mounted on said tubular conduit for producing a magnetic field within said tubular conduit.

18. Apparatus as claimed in claim 17 further including agitating means in said conduit for causing seeds moving through the magnetic field to roll and tumble while in the magnetic field to vary the orientation of the seeds with respect to the magnetic field to induce magnetism into the seeds.

19. Apparatus as claimed in claim 18 wherein said agitating means comprises a plurality of stationary baffles spaced along the length of said tubular conduit for deflecting seeds away from the wall of said conduit, and rotating means for centrifugally hurling seeds toward the wall of said conduit.

20. Apparatus as claimed in claim 19 wherein said rotating means comprises a shaft having a plurality of disc members mounted thereon and spaced from each other along the length of said shaft.

21. Apparatus as claimed in claim 20 wherein each of said disc members comprises a circular segment extending 270° around the axis of said shaft, adjacent pairs of said disc members being angularly staggered about the axis of said shaft with respect to each other.

22. Apparatus as claimed in claim 21 wherein each of said disc members is shaped to define a portion of the surface of a cone with the large end thereof located with respect to the small end thereof toward the inlet end of said conduit.

23. Apparatus as claimed in claim 22 wherein said baffles are inclined away from the wall of said conduit toward the outlet of said conduit.

* * * * *